May 9, 1961  S. KUGLER  2,983,106

CONVERTER SYSTEM FOR LIQUEFIED GASES

Filed Aug. 14, 1959

Inventor
SIMON KUGLER
By
Aaron R. Townshend Attorney

United States Patent Office 2,983,106
Patented May 9, 1961

2,983,106
CONVERTER SYSTEM FOR LIQUEFIED GASES

Simon Kugler, Cockfosters, England, assignor to The British Oxygen Company Limited, a company of Great Britain Filed Aug. 14, 1959, Ser. No. 833,818

Claims priority, application Great Britain Aug. 15, 1958

3 Claims. (Cl. 62—51)

This invention relates to a converter system for liquefied gases, and has for its object to provide an improved system in which equipment is reduced to a minimum, and which is also adapted to be re-charged with liquefied gas without depressurising the converter.

A converter comprises a storage vessel which is heat-insulated, so that heat inleak to the very cold liquefied gas is minimised to prevent undue loss of gas while the converter is standing ready for use.

In a converter system as hitherto constructed, and upon which the present invention seeks to improve, it has been the practice to provide a pressure build-up circuit which included a coil in which liquefied gas drawn from the storage vessel was evaporated to generate gas for feeding to the space above the liquefied gas in the converter vessel (hereafter referred to as the "gaseous phase" of the converter vessel as distinct from the liquid phase thereof). This generated gas was fed to the converter vessel via a pressure-actuated closing valve so as to pressurise the vessel to a degree determined by the pressure at which the pressure-actuated valve was closed, this pressure in the gaseous phase of the vessel forcing liquefied gas on demand into a delivery line extending from the liquid phase of the vessel for evaporation and consumption.

When it became necessary to re-charge the converter vessel with liquefied gas, the practice has been to depressurise the system by first venting the gaseous phase of the converter vessel to atmosphere and then feeding in liquefied gas into the liquid phase of the converter vessel while the vent was kept open.

It will be appreciated that a converter system has hitherto incorporated quite complicated equipment, including numerous valves and conduits, and that simplification and weight reduction are important advantages, particularly in portable equipment for industrial or medical use and equipment for aircraft use. The requirement to de-pressurise for re-charging involves wastage of valuable gas, a waiting period before the converter system is operative after re-charging, and also at least one valve. It will be apparent that a system which can be re-charged without depressurising provides another important advantage.

According to the present invention, a converter system comprises a storage vessel for liquefied gas which is enclosed by heat insulation, a breakable heat-conductive bridge which extends between the wall of said storage vessel and across the heat insulation to the ambient atmosphere for conducting heat inwardly to the storage vessel for vaporising the liquefied gas, said bridge comprising at least two parts which are movable out of contact with each other to break the heat-conductivity of the bridge and pressure-sensitive means being provided for moving said parts out of contact with each other automatically when a predetermined pressure is attained in the gaseous phase of the storage vessel, the gaseous phase of the storage vessel being in communication with said pressure-sensitive means, with a filler valve whereby liquefied gas can be fed in to re-charge the storage vessel, and with a delivery line to which evaporated gas from the gaseous phase of the storage vessel passes for consumption.

Preferably the heat-conductive bridge is so located that it conducts heat to a part of the storage vessel associated with the liquid phase of the gas within the vessel, for example the bridge may be at the bottom of the vessel when the latter is in its normal upright position.

Filling of this converter system while under pressure is effected by connecting the filler valve with a source of supply of liquefied gas which is at such condition of pressure, or pressure and temperature, that gas in the gaseous state in the gaseous phase of the storage vessel is condensed by the incoming re-charging gas, which therefore occupies the space previously occupied by the gaseous gas. There is therefore no need to vent the system and no gas is wasted during re-charging, the operation of re-charging being completed when the pressure of the incoming liquefied gas balances with the pressure within the converter system.

Ideally the filling operation results in a newly charged converter system which is at operative pressure, with the liquefied gas therein as nearly as possible at the temperature at which it boils under these operative conditions.

An embodiment of the invention will now be described with reference to the accompanying drawings, in which.

Figure 2:
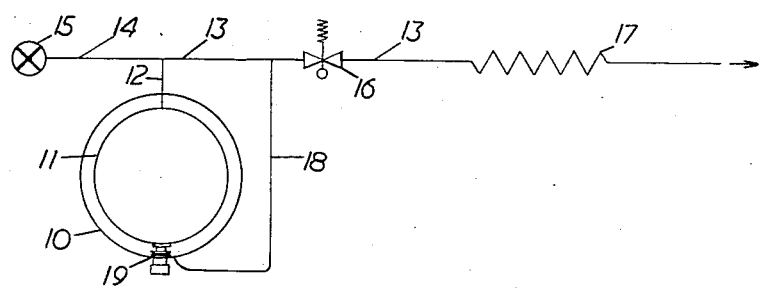
Fig. 2 is a diagrammatic representation of a converter system according to the present invention.

Referring particularly to Fig. 2 of the drawings, the converter illustrated comprises an outer spherical shell or wall 10, preferably of metal, and an inner spherical storage vessel 11 in which liquefied gas is stored, the space between the two being evacuated to provide heat insulation.

A conduit 12 is connected to the gaseous phase at the top of the vessel 11, and it extends through the space between the vessel 11 and the outer shell 10 before passing in gas-tight manner through the shell 10 to join up with a delivery line 13 and a filler line 14. The filler line 14 terminates in a filler valve 15, while the delivery line contains a pressure relief valve 16 and a warm-up coil 17.

Figure 1:
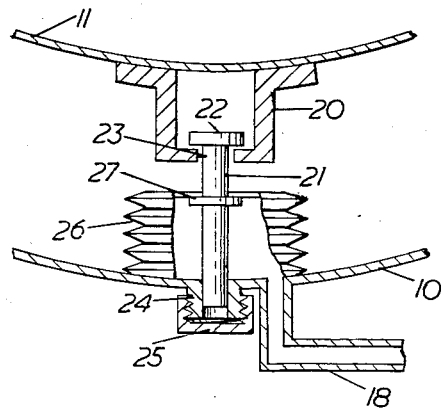
Fig. 1 is a diagrammatic sectional detail view, showing the heat-conductive bridge mechanism.

A branch conduit 18 extends from the delivery line 13 back to the bottom of the converter to the heat-conductive bridge mechanism, indicated generally by the reference numeral 19 in Fig. 2 and shown in detail in Fig. 1.

Referring to Fig. 1, secured to the outer surface of the wall of the inner vessel 11 is a metallic seat member 20, e.g. of copper, and co-acting with said seat member 20 is the upper end of a metallic rod 21, which may also be of copper, have an enlarged flat head 22. The rod 21 passes through a clearance hole 23 in the seat member 20, and by vertical movement of the rod 21 the head 22 can be caused either to engage the seat member 20 or to lift out of engagement therewith, as shown in the drawing.

The lower end of the rod 21 slides in a bush 24 on the outer vessel 10, and the bush 24 carries a blanking-off cap 25. When the head 22 of the rod 21 is in contact with the seat member 20 a heat-conductive bridge between the inner vessel 11 and the ambient atmosphere is completed via the seat member 20, the rod 21 and the bush 24 on the outer vessel 10.

Mounted on the inner wall of the outer shell 10, so as to encompass the rod 21, is a flexible pressure-sensitive capsule 26 of the bellows type, the interior of which is in constant communication with the delivery line 13 and the gaseous phase of the vessel 11 via the branch conduit 18.

As gas is evaporated within the vessel 11 by heat input through the bridge mechanism, pressure builds up in the gaseous phase of the vessel 11, in the conduits 12, 13 and 18, and in the capsule 26, so that the latter is expanded.

The upper end of the capsule 26 is secured to the rod 21 at 27 so that when the capsule is expanded by a certain amount, corresponding to a predetermined gas pressure, the rod 21 will be raised and the heat-conductive bridge will be broken until such time as the pressure drops sufficiently to allow the capsule 26 to contract and the bridge to be completed, i.e. when gas is consumed in the delivery line 13. Heating means may be associated with the bridge to augment the heat input when the bridge is completed, and this may be an electric heater controlled manually or automatically.

It will be appreciated that the bridge mechanism described and illustrated diagrammatically is merey by way of example, and that other arrangements are envisaged which embody the principle of providing a breakable heat-conductive bridge across the insulation of a storage vessel for liquefied gas and a pressure-responsive means for breaking and completing the bridge automatically in accordance with the demand for gas.

The invention provides a converter system which is of extremely simple construction and in which equipment is reduced considerably in comparison with previous systems. Heat inleak is minimised by the fact that only one pipe crosses the heat insulation and the further major advantage is that the storage vessel can be re-charged, without venting and depressurising the system, via the filler valve 15 which communicates with the gaseous phase of the storage vessel.

The only occasion on which the system need be depressurised is for dismantling, and in this connection the pressure relief valve 16, which normally functions only as a safety valve during operation of the system and during re-charging, may be provided with a manual control for opening the valve to vent the system for dismantling.

With this filling technique involving re-charging by feeding liquefied gas into the gaseous phase of the storage vessel, it will be appreciated that if the pressure of the supply source is considerably higher than the operating pressure obtaining within the converter system, the pressure differential alone may be sufficient to effect condensation of the gaseous contents of the storage vessel, but it will be also appreciated that if the temperature of the liquefied gas of the supply source is sufficiently lower than the temperature conditions within the vessel, condensation of the gaseous contents and successful re-charging can be effected without the need for a considerable pressure differential, the success of this filling technique depending upon keeping all the liquefied gas in the storage vessel below the boiling point appropriate to the re-charging pressure, so that no gas in the gaseous phase is evolved which is not immediately re-condensed, and all space within the vessel is therefore filled with liquid.

What I claim is:

1. In a converter system for the storage and evaporation of liquefied gases, the combination of a storage vessel for liquefied gas, heat insulation enclosing said vessel, a breakable heat-conductive bridge which extends from the wall of said storage vessel and across the heat insulation to the ambient atmosphere for conducting heat inwardly to the storage vessel, said bridge comprising at least two parts which are movable out of contact with each other to break the heat-conductivity of he bridge, fluid-pressure-responsive means associated with one of said parts, conduit means connecting said fluid-pressure-responsive means with the gaseous phase of said vessel whereby said fluid-pressure-responsive means moves said one part to break the bridge when a predetermined pressure is attained in the gaseous phase of the storage vessel, a filler valve, conduit means connecting said filler valve with the gaseous phase of the vessel, and a vaporised gas delivery conduit leading from the gaseous phase of the storage vessel.

2. In a converter system for the storage and evaporation of liquefied gases, the combination of a storage vessel for containing liquefied gas, heat insulation enclosing said vessel, a breakable heat-conductive bridge which extends from the wall of said vessel, in the region of the base thereof, across the heat insulation to the ambient atmosphere for conducting heat inwardly to the storage vessel, said bridge comprising at least two parts which are movable out of contact with each other to break the heat-conductivity of the bridge, a fluid-pressure-responsive expansible bellows element connected to one of said bridge parts, conduit means connecting said element with the top region of said vessel whereby said element moves said one part to break the bridge when a predetermined vaporised gas pressure is attained in the gaseous phase of the vessel, a filler valve, conduit means connecting the filler valve with the top region of the storage vessel, and a vaporised gas delivery conduit leading from the top region of the storage vessel.

3. A converter system as claimed in claim 2, and including a pressure relief valve in said delivery conduit having a manual control for opening the valve to vent the system.

References Cited in the file of this patent

UNITED STATES PATENTS

| 1,564,612 | Mott | Dec. 8, 1925 |
| 2,451,903 | Bauman | Oct. 19, 1948 |
| 2,576,985 | Wildhack | Dec. 4, 1951 |

FOREIGN PATENTS

| 214,495 | Great Britain | Apr. 24, 1924 |